(12) United States Patent
Richter

(10) Patent No.: US 8,793,533 B2
(45) Date of Patent: Jul. 29, 2014

(54) METHOD AND DEVICE FOR PERFORMING FAILSAFE HARDWARE-INDEPENDENT FLOATING-POINT ARITHMETIC

(75) Inventor: Jan Richter, Lüneburg (DE)

(73) Assignee: Siemens Aktiengesellschaft, Munich (DE)

( * ) Notice: Subject to any disclaimer, the term of this patent is extended or adjusted under 35 U.S.C. 154(b) by 456 days.

(21) Appl. No.: 13/257,891

(22) PCT Filed: Aug. 3, 2010

(86) PCT No.: PCT/EP2010/004753
§ 371 (c)(1),
(2), (4) Date: Sep. 20, 2011

(87) PCT Pub. No.: WO2012/016574
PCT Pub. Date: Feb. 9, 2012

(65) Prior Publication Data
US 2012/0221897 A1  Aug. 30, 2012

(51) Int. Cl.
*G06F 11/00* (2006.01)
(52) U.S. Cl.
USPC .............. 714/11; 714/48; 714/54; 708/495; 717/126
(58) Field of Classification Search
CPC ............ G06F 11/2236; G06F 11/1497; G06F 11/0721; G06F 11/16; G06F 11/22; G06F 11/2226; G06F 11/3608; G06F 2201/865; G06F 7/49957; G06F 9/3877; G06F 9/3885
See application file for complete search history.

(56) References Cited

U.S. PATENT DOCUMENTS

| | | | |
|---|---|---|---|
| 7,448,026 B1 * | 11/2008 | Gustafson et al. ............ | 717/130 |
| 8,539,451 B2 * | 9/2013 | Ivancic et al. ................ | 717/126 |
| 2005/0204194 A1 * | 9/2005 | Curry .............................. | 714/27 |
| 2008/0172551 A1 * | 7/2008 | Yamashita et al. ............ | 712/227 |
| 2009/0183035 A1 | 7/2009 | Butler | |

FOREIGN PATENT DOCUMENTS

| | | |
|---|---|---|
| DE | 102 19 501 | 11/2003 |
| EP | 1 355 230 | 10/2003 |

OTHER PUBLICATIONS

Rump, Siegfried M. "Fast and Parallel Interval Arithmetic", vol. 39, No. 3, Swets & Zeitlinger, Lisse, the Netherlands, pp. 1-19, 1999.

* cited by examiner

*Primary Examiner* — Scott Baderman
*Assistant Examiner* — Jason Bryan
(74) *Attorney, Agent, or Firm* — Cozen O'Connor

(57) ABSTRACT

A method and device offering a software diversity of the cited type for floating-point arithmetic, which is applicable in a realtime environment, wherein the method and a device for high-performance validation of the calculation use floating-point numbers of any accuracy within the context of functional safety in accordance with International Electrotechnical Commission (IEC) standard 61508. The method utilizes a specific form of software diversity and has effects on both the runtime environment and the engineering environment.

19 Claims, 3 Drawing Sheets

FIG 2

Original data (floating-point numbers)
x
y
z = x + y

---

Diverse data (floating-point intervals)
$A = <a, a_{rad}>$
$B = <b, b_{rad}>$
$C = <c, c_{rad}>$
$c = a+b$, $c_{rad} = \varepsilon|c| + a_{rad} + b_{rad}$

---

Consistency checking
Minor - permitted interval width
$c_{rad}$ < Threshold value?
Major - consistency of original data/interval
$z \in C$?
Operation-specific, e.g.
$(a+0)/a = 1$?
$(0+a)/a = 1$?

METHOD AND DEVICE FOR PERFORMING FAILSAFE HARDWARE-INDEPENDENT FLOATING-POINT ARITHMETIC

CROSS-REFERENCE TO RELATED APPLICATIONS

This is a U.S. national stage of application No. PCT/EP2010/004753 filed 3 Aug. 2010, the content of which is incorporated herein by reference in its entirety.

BACKGROUND OF THE INVENTION

1. Field of the Invention

The present invention relates to industrial automation systems and, more particularly, to a method and device for performing failsafe hardware-independent floating-point arithmetic.

2. Description of the Related Art

The question of machine safety, i.e., functional safety, is becoming increasingly important in industrial automation. Functional safety is concerned with the demand that processes, which are potentially dangerous to humans or the environment, require risk reduction if the initial risk is unacceptably high. This observation relates to machines such as presses, rollers, robotic manipulators, the track occupancy on rail networks or the operation of cableways forth. The importance of functional safety is supported by standardization, such as the general basic International Electrotechnical Commission (IEC) standard 61508 for electrical and electronic systems.

Functional safety relates to all the components of a safety chain. However, the central, key element of the safety chain is the controller that performs the decision to switch the installation into the safe state. Here, the concept of the controller comprises any form of stored program or programmable logic control, i.e., both actual hardware controllers and state-of-the-art implementations such as Soft Programmable Logic Controller (PLC) (e.g., Siemens WinAC RTX) on embedded controllers, industry PCs and the like.

Conventionally, safety functions are primarily defined as logic decisions whose notation requires only logic data (BOOLEAN) and integers (INT, DINT). The typical intervention of such a safety system comprises switching off power supplies. Increasingly, the focus is shifting to more complex safety functions. This development is driven largely by applications in the field of motion control. Here, recent requirements include functions such as "safe speed", "safe position", "safe stop", "safe torque" and others whose processing involves the use of floating-point numbers. Further impetus for the increased use of floating-point numbers comes from the field of process control.

Two principles are available for implementing failsafe control, i.e., hardware diversity and software diversity.

Hardware diversity is based on the use of parallel and optionally diverse arithmetic units with subsequent consistency checking. This hardware diversity and software diversity represents the state of the art, and is marketed by many manufacturers to provide logical safety functions.

A solution based on software diversity is used in the F-series of the SIMATIC product family from Siemens, for example. Until now, safety programs in Distributed Safety could only utilize the data types BOOL, INT, and DINT as described above, and thus provide mainly logical safety functions. The validation is based on diverse internal notation using arithmetic codes. This exemplary solution is known from the publication DE 102 19 501.

Application of this solution to floating-point numbers using arithmetic codes was examined in principle, and found to offer insufficient performance for product application. The execution times that were achieved are too long due to the complexity of the processing, particularly if an application is required in a realtime system.

In addition, floating-point numbers involve the occurrence of rounding problems, which cause further difficulties for the implementation of functional safety and are not addressed at all by the arithmetic codes model.

As a result of this situation, hardware-independent and hardware-based single-channel safe floating-point operations have not previously been available on the market.

SUMMARY OF THE INVENTION

It is therefore an object of the present invention to provide a method and device which offer a software diversity for floating-point arithmetic, while avoiding the aforementioned disadvantages. In particular, the described method is intended also to be applicable in a realtime environment.

It is also an object of the invention to achieve a Safety Integrity Level 3 (SIL 3), in accordance with (IEC) standard 61508 for calculations with floating-point numbers, on a standard CPU without hardware redundancy.

These and other objects and advantages are achieved in accordance with the invention by providing a method for performing failsafe, hardware-independent floating-point arithmetic in an automation system during the runtime of a program in which based on at least two items of starting data, these being floating-point numbers, a first result is established in a first calculation in a floating-point notation using standard floating-point arithmetic, the at least two items of starting data in the floating-point notation are each converted into a suitable floating-point interval notation, based on the at least two items of data that have been converted into the floating-point interval notation, a second calculation analogous to the first calculation is executed, i.e., within one computing cycle of the first calculation, and establishes a result interval, where the first result of the first calculation is checked for erroneous calculation based on the result interval established by the second calculation.

The object of the invention is also achieved by a device comprising an engineering environment of an automation system and a processor (interval arithmetic) for performing floating-point arithmetic.

In accordance with the disclosed embodiments of the invention, the method and a device for high-performance validation of the calculation use floating-point numbers of any accuracy within the meaning of functional safety in accordance with the IEC standard 61508. The method utilizes a special form of software diversity and has effects on both the runtime environment and the engineering environment.

Runtime:

In accordance with the disclosed embodiments of method of the invention, a dual notation of the data and operands is performed within the controller using a different format. The key to the method is the selected type of diverse notation, which is based on intervals. Here, each parameter and operand x(a real number that cannot actually—or indeed generally—be represented) is guaranteed to be encompassed by an interval $A = <a_{mid}, a_{rad}>$ of two floating-point numbers that can be represented.

The parameters of a floating-point interval are the midpoint $a_{mid}$ and the radius $a_{rad}$. During operation, all calculations are performed twice, once uncoded in a conventional manner, and once coded at the cited intervals. The characteristics of the interval arithmetic ensure that a shadow calculation always encompasses the true result in the interval range. The interval arithmetic is available for the four basic types of calculation (i.e., addition, subtraction, multiplication and division), as well as for scalar operations and for vector/matrix operations. Using series expansion or tables and interpolation, the interval arithmetic is also available for more complex functions, such as transcendental functions (i.e., trigonometric functions and/or exponential functions)

Errors can be detected using the following consistency checks:

Major consistency test:

Check whether original data is contained in the interval data.

This check detects inconsistencies between the original data and the interval, which can be caused by corruption due to random errors.

Minor consistency test:

Check whether the interval width is permitted.

This check provides a reliable indication of the computational accuracy that is currently guaranteed. It is also possible to provide for the triggering of an alarm or to possibly switch parts of the installation into a safe state if a user-selectable threshold is exceeded or is not reached. This check also helps to protect against specific deterministic hardware errors.

Check for correct execution of the operations using operand-dependent tests:

Dangerous system-inherent malfunctions of the operations can be detected, even if their effect is operand-dependent, by also checking valid mathematical identities for the current operands.

The Safety Integrity Level (SIL) is a measure for determining the potential risk of systems, devices and processes in the event of a malfunction. The IEC Standard 61508 forms the basis for the specifications, design and operation of safety instrumented systems (SIS).

These safety levels SIL are dependent inter alia on the Safe Failure Fraction (SFF) and the Hardware Fault Tolerance (HFT). The Safe Failure Fraction of a system is in turn determined by the relationship between two types of error, i.e., basic errors and errors that are recognized as being dangerous. These are taken from a separate report. Further details of these aspect can be found in IEC standard 61508.

The performance of the method in accordance with disclosed embodiments is derived from the overhead involved in the implementation of an interval arithmetic. Overall, this overhead is moderate.

A diverse notation includes any notation as an interval, irrespective of which of the possible notations is used (midpoint/radius notation, infimum/supremum notation, or other notations).

Due to the specific requirements of the safety applications, i.e., due to the cyclical resetting of the interval width, the midpoint/radius notation is particularly advantageous.

In an advantageous embodiment of the invention, two separate intervals are used for detecting errors and for detecting a bad numeric condition. In this case, the interval width for error detection can be reset to zero after each successful operation, thereby allowing a particularly high level of diagnostic coverage. The interval notation for detecting a bad condition can optionally be omitted if only error detection is required.

In a further advantageous embodiment, the protection against random errors is supplemented by additional cyclical self-tests of the floating-point unit of the PLC in respect of system-inherent errors.

In a further advantageous embodiment, interval parameters are also stored in coded format in one's complement or using an arithmetic code, and completely decoded before each processing.

In a further advantageous embodiment, based on an interval that has been reset and arithmetic coding of the interval midpoint, the lexical order of the Institute of Electrical and Electronic Engineers (IEEE) 754-compliant notation of floating-point numbers is used for the arithmetically coded comparison of floating-point number intervals. It is then unnecessary to decode the arithmetically coded operands for the comparison.

Engineering

The engineering environment of an automation system is extended such that an interval shadow of the floating-point user program is generated by a compiler during translation of the F-program. Here, corresponding internal system modules are generated for each module, containing an interval shadow of the program which is executed at runtime.

In an advantageous embodiment, the engineering environment is extended to include a check of the user program in respect of numerical stability for an anticipated number range. As a result, a user is enabled to check whether the program runs in a numerically stable manner or whether the operation of the controlled process is jeopardized by computing problems in the controller.

The overall model consists of (i) a specific extension of the engineering environment for generating floating-point user programs with an interval map, (ii) an extension of the runtime environment for processing the interval shadow of a floating-point user program, and (iii) at least one failsafe-specific consistency check, which is configured for the purpose of detecting errors.

For the first time, the disclosed embodiments of method in accordance with the invention allow validation of floating-point numbers on single-channel hardware, which can be implemented on a runtime environment with acceptable efficiency. It is therefore a key to new and improved safety functions, i.e., in the application fields of motion control and process automation. The advantage is derived from the considerable reduction in overhead in comparison with the validation of floating-point numbers using arithmetic codes. Moreover, the disclosed embodiments of the method are independent of the hardware details.

The engineering extension provides an assessment of the numerical stability of local programs that process floating-point numbers. Such user support did not previously exist.

The disclosed embodiments of the method of the invention can also be used outside the field of failsafe software, and support the user during the formulation of programs.

Finally, the disclosed embodiments of the method allow floating-point arithmetic to be made available for failsafe calculation without losing the advantage of hardware independence and the associated freedom when configuring the underlying processors. On the contrary, seamless integration into the existing software diversity model is allowed in the form of Distributed Safety.

The described embodiments of the method increase the complexity of validated shadow operations relative to the original operations. However, the additional overhead is considerably less than for corresponding hypothetically and arithmetically coded floating-point operations.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described below with reference to exemplary embodiments, in which:

FIG. 2 shows an exemplary calculation using floating-point numbers in accordance with the invention.

DETAILED DESCRIPTION OF THE PREFERRED EMBODIMENTS

Figure 1:
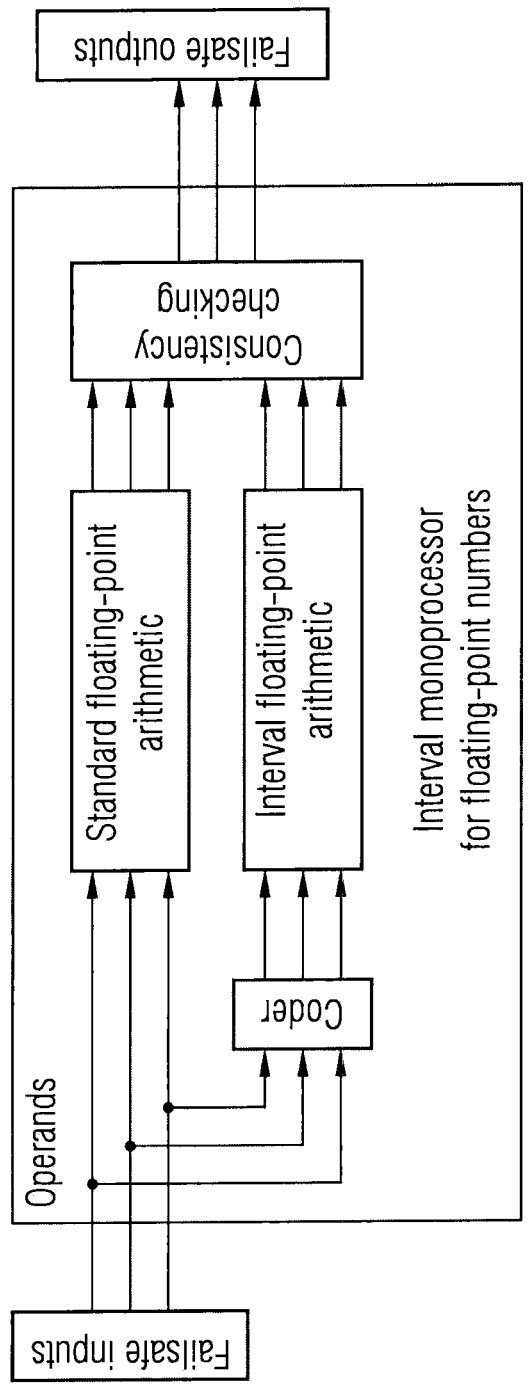
FIG. 1 shows a schematic block diagram of the calculations that are performed in accordance with the invention.

During operation, all of the calculations are performed twice (see FIG. 1).

The operands are fed into the appropriate processor, once in unmodified format and then in coded format after conversion by the coder. A first calculation result is obtained using standard floating-point arithmetic. An interval shadow is obtained from a second calculation using interval floating-point arithmetic.

In the subsequent consistency check, the calculation result that is obtained is merged and examined for erroneousness as described above. Only then is the calculated result forwarded, assuming the correctness of the calculation has been confirmed.

FIG. 2 shows an example of a diverse addition in accordance with the method of the invention.

In the following example, x and y designate two floating-point number operands that are to be added. The addition result is designated as z. A designates the interval map of x, B the interval map of y, and C the interval map of z. The symbol E designates the machine accuracy (in accordance with IEEE standard 754, $\epsilon = 5.960464 * 10-8$ for 32-bit floating-point numbers).

Consistency checks evaluate the diversity of the interval notation to detect errors.

In a consistency check relating to a permitted interval width, the threshold value for $c_{rad}$ is a value that is dependent on the required level of diagnostic coverage and the operation, and which lies within the scope of the machine accuracy. The size of the threshold value defines the extent to which corruptions are acceptable.

Based on these checks, it is possible to detect both exploding rounding errors (due to a bad numeric condition of the data or the algorithm) and dangerous corruption due to hardware or software errors. It is also quite easy to concentrate purely on detecting dangerous corruptions.

Figure 3:
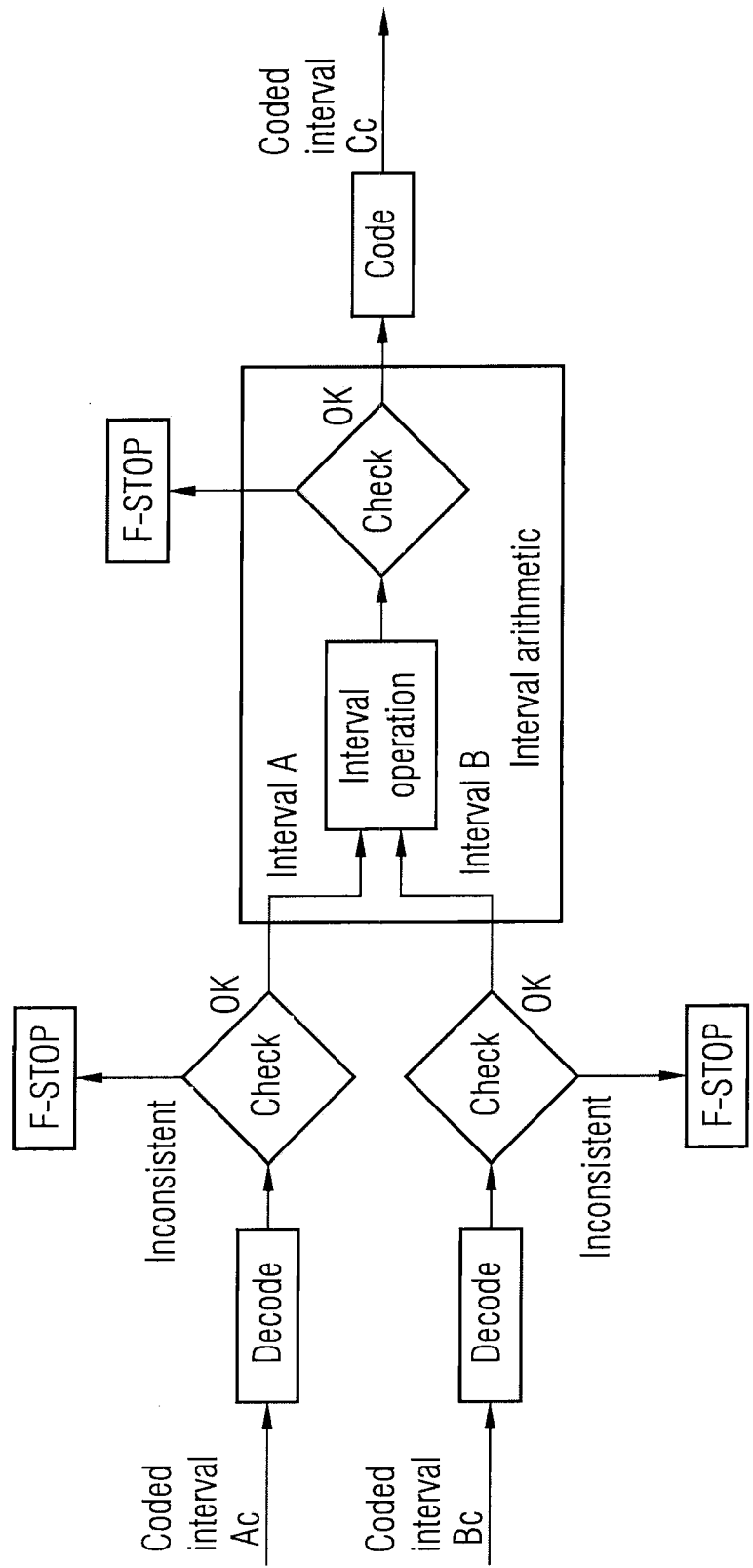
FIG. 3 is a flow chart of a method with additional checking in accordance with an embodiment of the invention.

The integration of realtime (runtime) environment and engineering components is advantageous. FIG. 3 shows a combination of the interval arithmetic and arithmetic codes to protect the data during transport. The intervals for the calculation (coded interval Ac and Bc) are each decoded and submitted to a check for inconsistencies. If the check has a negative result, the system is stopped (F-STOP). Otherwise, the interval operation is performed using the decoded intervals (A, B) in the interval arithmetic. The result (interval C) is then re-submitted to a check and is re-coded if the result is correct (coded interval Cc).

In addition, the integration relates to, e.g., a safe coupling of sensor data of the data type REAL and the safe output of actuator data of the data type REAL, and to the coupling to current bus protocols (PROFIBUS and also by PROFINET).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for performing failsafe, hardware-independent floating-point arithmetic in an automation system during runtime of a computer program in real time, the method comprising:
    establishing, in an arithmetic unit, a first result in a first calculation in floating-point notation using standard floating-point arithmetic based on a plurality of items of starting data comprising floating-point numbers;
    converting, in the arithmetic unit, the plurality of items of starting data in floating-point notation into a floating-point interval notation; and
    executing, in the arithmetic unit, a second calculation, which is analogous to the first calculation, based on the plurality of items of starting data converted into the floating-point interval notation, the second calculation establishing a result interval;
    wherein the first result of the first calculation is checked for erroneous calculation based on the result interval established by the second calculation.

2. The method as claimed in claim 1, wherein the floating-point interval Iis defined by a midpoint and a radius.

3. The method as claimed in claim 1, wherein the floating-point interval is defined by a minimum value and a maximum value.

4. The method as claimed in claim 1, wherein checking of the first result determines whether the first result is within the result interval, the first result being calculated concurrently by the second calculation which is analogous to the first calculation.

5. The method as claimed in claim 1, wherein the result interval includes a permitted interval width, the result interval being calculated concurrently by the second calculation which is analogous to the first calculation.

6. The method as claimed in one of claim 1, wherein checking occurs by operand-dependent tests.

7. The method as claimed in claim 1, wherein safety parameters to be tested are at least one of selectable and quantifiable.

8. The method as claimed in claim 1, further comprising:
    performing a first check to ensure a failsafe calculation is based on a first interval notation; and
    performing a second check of a numeric condition based on a second interval notation.

9. The method as claimed in claim 8, wherein a result of the first and second checks is recorded in a separate check report.

10. The method as claimed in claim 1, further comprising:
performing a periodically recurring self-test of the arithmetic unit in addition to and independently of floating-point arithmetic calculations that are performed.

11. The method as claimed in claim 1, further comprising:
storing data in coded format in the floating-point interval notation in one's complement or arithmetic code.

12. The method as claimed in claim 1, wherein the second calculation is executed concurrently with the first calculation.

13. The method as claimed in claim 1, wherein the arithmetic unit comprises a monoprocessor.

14. A device performing failsafe, hardware-independent floating-point arithmetic in an automation system during runtime of a computer program in real time, the device comprising:
an engineering environment of an automation system;
a processor configured to perform failsafe floating-point arithmetic comprising:
establishing a first result in a first calculation in floating-point notation using standard floating-point arithmetic based on a plurality of items of starting data comprising floating-point numbers;
converting the plurality of items of starting data in floating-point notation into a floating-point interval notation; and
executing a second calculation, which is analogous to the first calculation, based on the plurality of items of starting data converted into the floating-point interval notation, the second calculation establishing a result interval;
wherein the first result of the first calculation is checked for erroneous calculation based on the result interval established by the second calculation.

15. The device as claimed in claim 14, wherein an interval map corresponding to an application program is generated, containing the data in the floating-point interval notation.

16. The device as claimed in claim 14, wherein the processor is further configured to:
receive a coded interval;
decode the received coded interval;
check the decoded interval; and
code a newly calculated interval into a coded interval.

17. The device as claimed in claim 15, wherein the processor is further configured to:
receive a coded interval;
decode the received coded interval;
check the decoded interval; and
code a newly calculated interval into a coded interval.

18. The device as claimed in claim 14, wherein the device is configured to couple to a bus protocol.

19. The device as claimed in claim 18, wherein the bus protocol is PROFIBUS.

* * * * *